(12) United States Patent
Goktekin et al.

(10) Patent No.: US 8,135,217 B2
(45) Date of Patent: Mar. 13, 2012

(54) METHOD FOR OPTIMIZED CAMERA POSITION FINDING FOR SYSTEM WITH OPTICAL CHARACTER RECOGNITION

(75) Inventors: Cuneyt Goktekin, Potsdam (DE); Oliver Tenchio, Potsdam (DE)

(73) Assignee: Beyo GmbH, Potsdam (DE)

( * ) Notice: Subject to any disclaimer, the term of this patent is extended or adjusted under 35 U.S.C. 154(b) by 0 days.

(21) Appl. No.: 12/963,651

(22) Filed: Dec. 9, 2010

(65) Prior Publication Data
US 2011/0181735 A1    Jul. 28, 2011

(30) Foreign Application Priority Data
Dec. 10, 2009  (EP) ..................................... 09178778

(51) Int. Cl.
*G06K 9/00* (2006.01)
(52) U.S. Cl. ........ 382/181; 382/182; 382/183; 382/106; 382/289
(58) Field of Classification Search .................. 382/181, 382/182, 183, 184, 106, 289, 137; 235/435; 348/188, 237; 358/3.06
See application file for complete search history.

(56) References Cited

U.S. PATENT DOCUMENTS

| | | | |
|---|---|---|---|
| 6,266,441 B1 * | 7/2001 | Hashimoto et al. | 382/170 |
| 7,586,650 B2 * | 9/2009 | Washio | 358/3.15 |
| 7,697,789 B2 * | 4/2010 | McCandlish et al. | 382/299 |
| 7,912,323 B2 * | 3/2011 | Okuno et al. | 382/300 |
| 2002/0097904 A1 * | 7/2002 | White | 382/151 |
| 2008/0068660 A1 * | 3/2008 | Loce et al. | 358/3.06 |

\* cited by examiner

*Primary Examiner* — Samir Ahmed
*Assistant Examiner* — Ali Bayat
(74) *Attorney, Agent, or Firm* — Mark M. Friedman

(57) ABSTRACT

The present invention relates to a method for aligning a camera sensor to significant data which is text or barcode data to be recognized comprising the steps of:—capturing an image of the significant data by means of the camera sensor; —detecting a predominant alignment line of the significant data and detecting an angle thereof in relation to a horizontal line of the captured image; —determining image sections within the edge and line enhanced image which contain most likely significant data lines; —selecting a representative image section out of the determined image sections which is aligned with the predominant alignment line; —capturing a following image of the significant data; tracking the representative image section and determining the predominant alignment line out of the representative image section to achieve a fast calculation and audio or tactile feedback of the alignment quality to the user.

7 Claims, 1 Drawing Sheet

METHOD FOR OPTIMIZED CAMERA POSITION FINDING FOR SYSTEM WITH OPTICAL CHARACTER RECOGNITION

BACKGROUND OF THE INVENTION

The present invention relates in general to a method for an optimized camera position finding for systems with optical character recognition. Furthermore, in more detail, the present invention relates to a method for supporting camera based services using a device with an integrated camera, in particular a portable communication device with an integrated camera for taking an image of a page with significant data, in particular with text data in order to recognize the significant data in an automatic way.

Generally speaking, the direction respectively the alignment of the camera sensor with the significant data, in particular text data, is of importance in order to achieve a good automatic recognition e.g. for an optical character recognition (OCR) for text, which is quite sensitive for disalignments. For finding a good camera position with sufficient alignment between the camera sensor and the significant data, in particular text data, it is necessary for the user bringing the camera into a sufficiently good position and to get a fast feedback of the degree of alignment and disalignment, respectively.

Portable communication devices are widely used in daily life by users wishing to perform communication in an easy manner and at every time independent of any fixedly installed communication terminals. Nowadays such portable communication devices offer integrated camera sensors and a great number of services including WAP service and the like. If a user wants to use a WAP service or the like then he has to input several data related to the WAP service he/she wishes, so it is often troublesome to input all these data using the numeric keypad. Accordingly, it becomes obvious to use the camera with image data recognition, OCR means or the like in the portable communication devices in the future. But in order to get a sufficient OCR quality the camera must be in alignment with the significant data to be detected, in particular with text data. To achieve the latter known systems have relatively slow feedback trying to bring the camera into a sufficient good position. In particular, visually impaired persons have problems correcting such a camera system for achieving proper alignment with the significant data to be recognized, inasmuch as visually impaired persons cannot see indications on a little display screen or have difficulty following acoustical instructions having additional delays until they are output, so that the correction of the camera alignment can only be made in slow and delayed steps.

Therefore, it is an objective of the present invention to provide for a method for aligning a camera sensor to a significant data to be recognized which avoids the shortcomings of the prior art and provides for a fast feedback in order to allow to a user a proper alignment of the camera sensor to the significant data contained in an image.

In the framework of the above object it is an additional object of the present invention to provide for a feedback for proper alignment of the camera sensor to the significant data contained in an image in a manner easily discernible for a user, in particular a visually impaired user.

SUMMARY OF THE INVENTION

The above objects as well as further objects which will become apparent from the following description are achieved by the features mentioned in the independent claim. Additional features and characteristics of the invention are mentioned in the dependent claims.

The above objects and further objects which will become apparent from the following description are achieved by a method for aligning a camera sensor to a significant data to be recognized comprising the steps of:

a) capturing an image of the significant data by means of the camera sensor;

b) contrast adaption, shade compensation and adaptive binarization of the image to obtain an artifact reduced image;

c) edge and line filtering of the artifact reduced image to obtain an edge and line enhanced image;

d) processing a transformation of the edge and line enhanced image by means of a robust algorithm for predominant alignment line angle detection of the significant data contained in the image in respect to a horizontal line of the camera sensor, such as to obtain, a predominant alignment line, the predominant alignment line angle representing the inclination of the predominant alignment line in respect to the horizontal line;

e) determining image sections within the edge and line enhanced image which contain most likely significant data lines, comprising the following sub-steps:
- detecting significant data lines which are substantially in alignment with the predominant alignment line;
- determining distances between adjacent significant data lines; and
- determining the image sections with substantially equally spaced apart adjacent significant data lines;

f) selecting a representative image section out of the determined image sections with the highest likelihood of containing significant data and being aligned with the predominant alignment line;

g) capturing a following image of the significant data by means of the camera sensor;

h) applying steps b) and c) again, taking the following image now as the image for said image processing within steps b) and c) and obtaining an edge and line enhanced image;

i) detecting and tracking the representative image section within the edge and line enhanced image of step h);

k) starting the process again at step d) if the representative image could not be detected and tracked again within step i);

l) determining the predominant alignment line angle from the representative image section in respect to the horizontal line of the camera sensor;

m) generating an user feedback signal dependent on the predominant alignment line angle and checking whether the predominant alignment line angle is equal or below a threshold;

n) repeating the process from step g) onwards if the predominant alignment line angle is above the threshold and the process of the alignment of the camera sensor to the significant data is not stopped by other means such as user action;

n) storing the last taken image or making immediately a high resolution image for a further processing if the predominant alignment line angle is below or equal to the threshold or if the process of the alignment of the camera sensor to the significant data is stopped by other means such as user action.

Advantageously, the robust algorithm for predominant alignment line angle detection is a Hough transformation algorithm. Alternatively, another robust algorithm for predominant alignment line angle detection is a star method algorithm, which determines distances of multiple heuristic lines with different inclinations to end points of the binarized text points, which is described more in detail in WO2009068328 (A1).

The feedback signal may be an audio signal having a variable tone frequency in dependence on the detected predominant alignment line angle. Alternatively, the feedback signal may be a tactile signal having a variable frequency in dependence on the detected predominant alignment line angle. Also a combination of both audio and tactile signals are envisaged by the invention. Furthermore, an LED signal alone or in combination with an audio and/or tactile signal can be envisaged.

Following the detection of the predominant alignment line angle the method of the invention further comprises the detection of image sections with most likely significant data blocks as parts of the image, comprising the following steps: detecting significant data lines which are substantially in alignment with the predominant alignment line; determining distances between adjacent significant data lines; determining image sections with equally distanced adjacent significant data lines; determining the rectangle corner coordinates of image sections; and storing the coordinates of the rectangle image sections for later use.

Moreover, according to an advantageous aspect of the invention, the complexity of data processing is reduced and the detection speed thereof is increased when the following steps are implemented: selecting a representative image section with the highest likelihood of containing significant data; capturing a following image of the significant data by means of the camera sensor; tracking the representative image section within the following image; and determining a predominant alignment line angle within the representative image section in the following image by applying steps b) through e) as above, such as to obtain a reduced image data processing time for getting a faster detection of the predominant alignment line angle within the representative image section in the following image with quicker possible feedback to the user holding the camera over a page with significant data. In the above context the term "following image" designates an image temporally following a first "image" as recorded by a video camera.

According to the invention the significant data is text data or other image data, in particular two- or tree-dimensional barcode data, pictogram data or face image data.

As apparent from the foregoing the present invention provides a method for efficient detecting the degree of alignment and for giving immediate feedback to the user, in particular a tactile or acoustical feedback by tone pitches depending on the degree of alignment. The present invention provides for users a reliable and fast feedback enabling the users to bring the camera into the right position. In particular visually impaired persons, who use such a system for OCR detection with Text-to-Speech (TTS) output, become enabled to bring the camera into a sufficient good position over the significant data.

DETAILED DESCRIPTION

Figure 1:
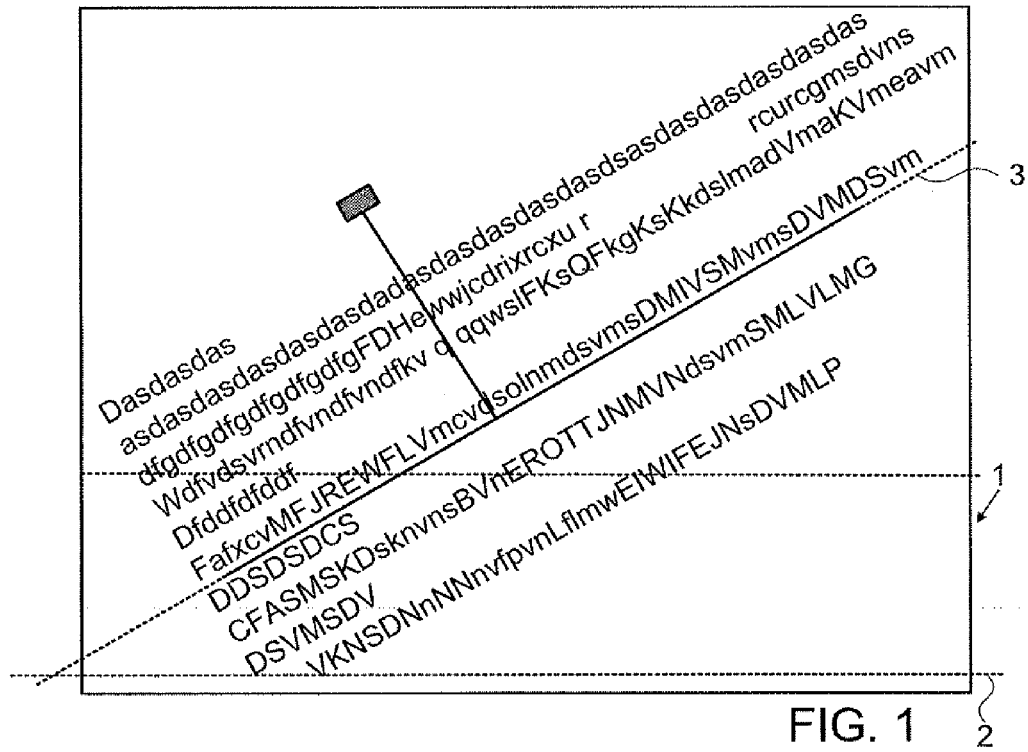
FIG. 1 shows an image with text captured by means of a camera.

FIG. 1 shows an image 1 captured by means of a (not shown) camera which is held over a page containing significant data (in the particular embodiment text) that is to be recognized by means of an optical character recognition software (OCR software) and acoustically outputted by means of text-to-speech software (TTS software). Both the OCR software and the TTS software are conventional and familiar to those skilled in the art, and for this reason the description thereof will be omitted. FIG. 1 further shows an alignment line 2 of a (not shown) camera sensor which is identical with an X axis (or a horizontal axis) of the camera sensor. Moreover, FIG. 1 shows a determined predominant alignment line 3 of significant data lines, in particular of shown text lines within the image 1.

According to the invention there is provided a method determine the predominant alignment line 3 of significant data lines, in particular of shown text lines within the image 1 and to output its deviation angle from the alignment line 2 of the camera sensor by signalizing it immediately via acoustical and/or vibration signals to the user.

The method of the invention provides in a first step for an appropriate software implemented filtering of the image 1 by means of a contrast adaption algorithm in order to enhance the contrast of the image 1, by a shade compensation algorithm in order to suppress shades within the image 1, and by an adaptive binarization of the image in order to obtain an artifact reduced image. The artifact reduced image is then processed by software means of an edge and line filtering algorithm, obtaining an enhanced artifact reduced image. The enhanced artifact reduced image data are then processed by a robust algorithm, in particular a Hough algorithm, for determination of the predominant alignment line 3 of all significant data lines within the image frame corresponding with the image 1 of FIG. 1. The angle between the predominant alignment line 3 and the alignment line 2 of the camera sensor which is identical with the inclination of the predominant alignment line 3 is then inversely taken as a degree of quality of the picture for later OCR detection, where a small positive or negative (absolute) inclination of the predominant alignment line 3 correlates with a high degree of quality and a higher positive or negative (absolute) inclination between −45 and +45 angle degrees correlates with a poorer degree of quality for later OCR detection. In particular an inclination of −90 or +90 angle degrees can also correlate with a high degree of quality of the image 1, depending on the OCR software of the system. The degree of quality is then immediately outputted, in particular by an acoustical signal with a certain tone pitch, in particular smaller absolute inclinations of the predominant alignment line 3 become signalized by a higher tone pitch and higher absolute inclinations of the predominant alignment line 3 from −45 to 45 angle degrees become signalized by a lower tone pitch. This way the user gets an immediate response of a worse or better alignment correlation and knows immediately into which direction he shall rotate the camera.

It is also conceivable in the present invention that instead of or additional to outputting an acoustical signal with a certain tone pitch depending on the inclination of the predominant alignment line 3 respectively the correlation between the predominant alignment line 3 and the alignment line 2 of the camera sensor there is outputted also a vibration signal with a variable vibration frequency corresponding to the inclination of the predominant alignment line 3.

It is also conceivable in the present invention that instead of analyzing text lines for determination of the predominant alignment line 3 within an image 1 there can also be used and detected concerning its alignments e.g. barcode lines, pictograms or picture shapes with certain significances, in particular e.g. faces.

Figure 2:
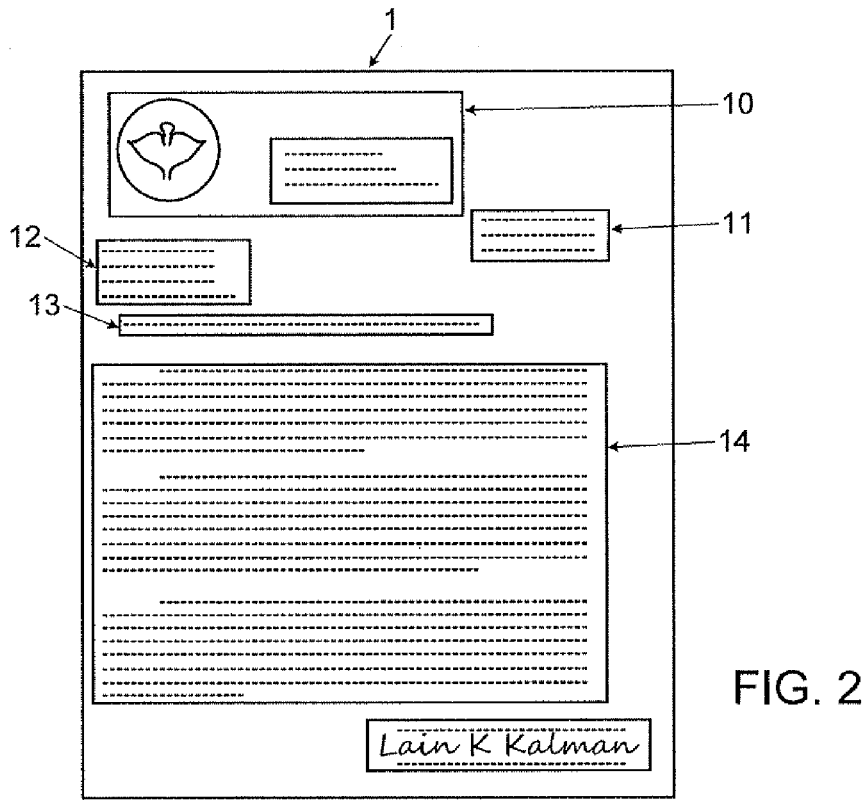
FIG. 2 shows an image of a page with text and in particular with text blocks defining image sections.

In order to improve the detection speed and to reduce processing complexity for determination of a current predominant alignment line 3 in a current image 1 it is also conceivable determining image sections 10, 11, 12, 13, 14 which contain significant data lines with equal distances to the adjacent lines in each case, in particular which contain text lines with equal distances to the adjacent text lines in each case, as is shown in FIG. 2. FIG. 2 shows obvious text blocks with text lines having similar distances in each case, which can be detected and separated into different text blocks or in other words into different image sections 10, 11, 12, 13 and 14. Thus, in order to improve detection speed for determination of a current predominant alignment line 3 in a current image 1 it is also conceivable figuring out a representative image section of all detected image sections containing most probable text lines and taking this section for following determination calculations in following captured images in order to determine the predominant alignment line 3. In this way the image data to be processed is reduced and thus there is an enhancement in detection and user feedback speed. In a following next captured image there is in a first step determined the previous representative image section then in a next step there is determined the at a time current predominant alignment line 3. This process of repetitive capturing next images and determining at a time current predominant alignment lines 3 and outputting its current inclinations by tone pitches is done as long as until the final good position is found and the process is stopped then by the main procedure.

As an example for the determination and tracking of a representative image section it is referred to FIG. 2, wherein multiple image sections containing significant data can be seen. Is now once the predominant alignment line 3 detected (not shown in FIG. 2) within an edge and line enhanced image, the next process step is to find a representative image section within the edge and line enhanced image, which alone represents with a high likelihood the alignment of the significant data of the whole image and which can be used within a following alignment detection of a captured following image. Therefore the image sections have to be determined containing text lines with substantially equal distances between the text lines. Then preferably the corner coordinates get stored for a later pattern analysis within the following image. In FIG. 2 there is preferably selected as representative image section, section 13, which is in alignment with the rest of the significant data lines and which has a long shape giving a good possibility for the detection of the predominant data line angle. Then if the angle is above a predefined threshold, it shows that the image is not good enough aligned with the camera sensor, and a new following image is captured.

Within the new following image after again line and edge enhancement the representative image section gets detected and tracked, whereupon the predominant alignment line angle detection process starts within the area of the representative image section. In the example of FIG. 2 the representative image section is about 5 Percent of the whole image, making power and calculation time savings obvious. In case that the representative image section cannot be found again within the following edge and line enhanced image, the whole procedure of selecting a new representative image section must start again.

After determination of the predominant alignment line angle, this result is preferably shown as acoustical, tactile and/or visual feed back to the user holding the camera sensor in his hand and trying to align it to the significant data, which is preferably text.

After the predominant alignment line angle is detected again, another following image is captured again and the process gets repeated again and again giving always immediate feedback to the user until the alignment between the significant data and the camera sensor is good enough which is indicated if the predominant alignment line angle is equal or below a defined threshold. Thereupon there is either used the last captured image or is captured immediately from the current aligned position of the camera sensor a high resolution image for preferably the further OCR image analysis. It is also conceivable in the present invention that the repetition of the process of image analysis with the feedback signal is stopped by other means as user action, for instance.

The invention claimed is:

1. A method for aligning a camera sensor to significant data which is text or barcode data to be recognized comprising the steps of:
   a) capturing an image of the significant data by means of the camera sensor;
   b) adapting contrast, compensating shade and processing an adaptive binarization of the image to obtain an artifact reduced image;
   c) edge and line filtering of the artifact reduced image to obtain an edge and line enhanced image;
   d) processing a transformation of the edge and line enhanced image by means of a robust algorithm for predominant alignment line angle detection of the significant data contained in the image in respect to a horizontal line of the camera sensor, such as to obtain a predominant alignment line, the predominant alignment line angle representing the inclination of the predominant alignment line in respect to the horizontal line;
   e) determining image sections within the edge and line enhanced image which contain most likely significant data lines, comprising the following sub-steps:
      detecting significant data lines which are substantially in alignment with the predominant alignment line;
      determining distances between adjacent significant data lines; and
      determining the image sections with substantially equally spaced apart adjacent significant data lines;
   f) selecting a representative image section out of the determined image sections with the highest likelihood of containing significant data and being aligned with the predominant alignment line;
   g) capturing a following image of the significant data by means of the camera sensor;
   h) applying steps b) and c) again, taking the following image now as the image for said image processing within steps b) and c) and obtaining an edge and line enhanced image;
   i) detecting and tracking the representative image section within the edge and line enhanced image of step h);
   k) starting the process again at step d) if the representative image could not be detected and tracked again within step i);
   l) determining the predominant alignment line angle from the representative image section in respect to the horizontal line of the camera sensor;
   m) generating an user feedback signal dependent on the predominant alignment line angle and checking whether the predominant alignment line angle is equal or below a threshold;
   n) repeating the process from step g) onwards if the predominant alignment line angle is above the threshold and the process of the alignment of the camera sensor to the significant data is not stopped by other means such as user action;
   n) storing the last taken image or making immediately a high resolution image for a further processing if the predominant alignment line angle is below or equal to the threshold or if the process of the alignment of the camera sensor to the significant data is stopped by other means such as user action.

2. The method of claim 1, wherein the robust algorithm for predominant alignment line angle detection is a Hough transformation algorithm or the like.

3. The method of claim 1, wherein the feedback signal is an audio signal having a variable tone frequency in dependence on the detected predominant alignment line angle.

4. The method of claim 1, wherein the feedback signal is a tactile signal having a variable frequency in dependence on the detected predominant alignment line angle.

5. The method of claim 1, wherein the feedback signal is an LED signal or the like or a combination thereof with an audio and/or tactile signal.

6. The method of claim 1, wherein the feedback signal is a combination of an audio signal and a tactile signal having a variable frequency in dependence on the detected predominant alignment line angle.

7. The method of claim 1, wherein step e) also comprises after the determination of the image sections determining rectangle corner coordinates of the image sections; and storing the rectangle corner coordinates for later use.

* * * * *